(12) United States Patent  
Salvoni

(10) Patent No.: US 7,017,321 B2  
(45) Date of Patent: Mar. 28, 2006

(54) MACHINE FOR SEALING CONTAINERS BY APPLYING A COVERING FILM

(75) Inventor: Paolo Salvoni, Corte Franca (IT)

(73) Assignee: CFS Palazzolo S.p.A, Palazzolo (IT)

( * ) Notice: Subject to any disclaimer, the term of this patent is extended or adjusted under 35 U.S.C. 154(b) by 0 days.

(21) Appl. No.: 10/826,566

(22) Filed: Apr. 16, 2004

(65) Prior Publication Data

US 2004/0226262 A1   Nov. 18, 2004

(30) Foreign Application Priority Data

Apr. 17, 2003   (EP) ................... 03008981  
May 13, 2003   (EP) ................... 03010670

(51) Int. Cl.  
*B65B 57/00* (2006.01)

(52) U.S. Cl. .................. 53/76; 53/504; 198/460.1; 198/461.1

(58) Field of Classification Search .................. 53/478, 53/493, 494, 329.4, 389.5, 504, 545, 76; 198/460.1, 460.2, 461.1  
See application file for complete search history.

(56) References Cited

U.S. PATENT DOCUMENTS

| | | | | |
|---|---|---|---|---|
| 3,908,333 A * | 9/1975 | Cavanna | .................... | 53/389.5 |
| 4,197,935 A * | 4/1980 | Aterianus et al. | ........ | 198/460.1 |
| 4,394,896 A * | 7/1983 | McComas et al. | ............ | 53/494 |
| 4,640,408 A * | 2/1987 | Eaves | ...................... | 198/460.1 |
| 5,097,939 A * | 3/1992 | Shanklin et al. | ......... | 198/460.1 |
| 5,341,915 A * | 8/1994 | Cordia et al. | ............ | 198/460.1 |
| 6,244,421 B1* | 6/2001 | Hall | ........................ | 198/460.1 |
| 6,540,063 B1* | 4/2003 | Fallas et al. | ............. | 198/461.1 |
| 6,648,125 B1* | 11/2003 | Bershadsky | .............. | 198/460.1 |

* cited by examiner

*Primary Examiner*—Louis Huynh  
(74) *Attorney, Agent, or Firm*—Perman & Green, LLP

(57) ABSTRACT

A system for feeding containers on conveyor consisting of a feeder conveyer and an accumulator conveyor in which the speed of the accumulator conveyor is controlled to meter the distribution of containers to a processing station, such as a sealing unit.

7 Claims, 4 Drawing Sheets

MACHINE FOR SEALING CONTAINERS BY APPLYING A COVERING FILM

BACKGROUND OF THE INVENTION

The present invention is related to a machine for sealing containers by applying a covering film or a lid.

These machines are known from the state in the art. For these machines, it is necessary that several containers are located with a certain gap pattern, for example equidistantly, on an accumulation conveyor, before they are grabbed by a pusher arm, which transports the container to the sealing unit, where a film is applied to the containers. EP 0 680 880 for example describes a feeder unit which allows the equidistant accumulation of containers on the accumulation belt. The feeder unit comprises an accumulation conveyor, a feeder conveyor and at least one buffer conveyor which is interposed between the accumulation conveyor and the feeder conveyor. With the buffer conveyor it is assured that the containers are handed over to the accumulation conveyor at a pre set speed and at a pre set position. The containers are grabbed by the pusher arm while they are moved by the accumulation conveyor. This system works well, but is relatively complicated.

It is therefore the objection of the present invention to provide a machine for sealing containers, which does not have the disadvantages of the state of the art.

SUMMARY OF THE INVENTION

The problem is solved by a machine according to claim 1. Preferred features of the inventive machine are claimed in the dependent claims 2–7.

It was totally surprising and could not have been expected by a person skilled in the art that the inventive machine allows to space containers equidistantly on an accumulation belt which are randomly positioned on a feeder conveyor with very simple means. The inventive machine is operated easily and needs little maintenance.

The inventive machine for sealing containers has a container sealing unit, which applies a covering film on the containers. Additionally, the machine has a unit for feeding the containers to the sealing unit, which comprises an accumulation conveyor which is located upstream of the sealing unit and a feeder conveyor which feeds the containers to the accumulation conveyor. Both conveyors are driven by motor means. Additionally, the inventive machine comprises a first sensor which is preferably located in the end zone of the feeder conveyor and which detects the containers on the feeder conveyor, preferably their front edge. The speed of motion of the feeder conveyor is also detected by detection means and/or the speed is maintained constant. The first sensor and the detection means are connected to a control unit which controls the motor means of the accumulation conveyor such that the correct gap between two adjacent containers on the accumulation conveyor is achieved and that the speed of the accumulation conveyor and the speed of the feeder conveyor are synchronised during the handing over of the containers from the feeder conveyor to the accumulation conveyor. If the speed of the feeder conveyor is maintained constant, no speed detection means are needed, but the control unit must have the information about the magnitude-speed of the feeder conveyor.

Preferably, the machine comprises a second sensor which is located upstream of the first sensor and which detects the distance between two containers on the feeder conveyor. The second sensor is preferable also connected to the control unit which also control the motor means of the feeder conveyor. If the distance between two trays on the feeder conveyors is significantly smaller than the desired gap, the control unit reduces temporarily the speed of the feeder conveyor and/or it temporarily stops the backtray via a technical mean, preferably a mechanical mean.

The motor means of the accumulation—and/or the feeder conveyor can be any motor known by a person skilled in the art. However a servomotor for the feeder conveyor and a motor with full rotation intelligent control via an electronic cam are preferred.

The inventive machine comprises additionally pusher arms which can be detachably associated with multiple containers on the accumulation conveyor to transfer the containers to the sealing unit and from the sealing unit to a conveyor, which is located downstream of the sealing unit for removing the sealed containers from the inventive machine.

DESCRIPTION OF THE DRAWINGS

Further characteristics and advantages will become apparent from the following detailed description of FIGS. 1–4, which are, however, not limitative examples of the present invention.

DETAILED DESCRIPTION OF THE INVENTION

Figure 1:
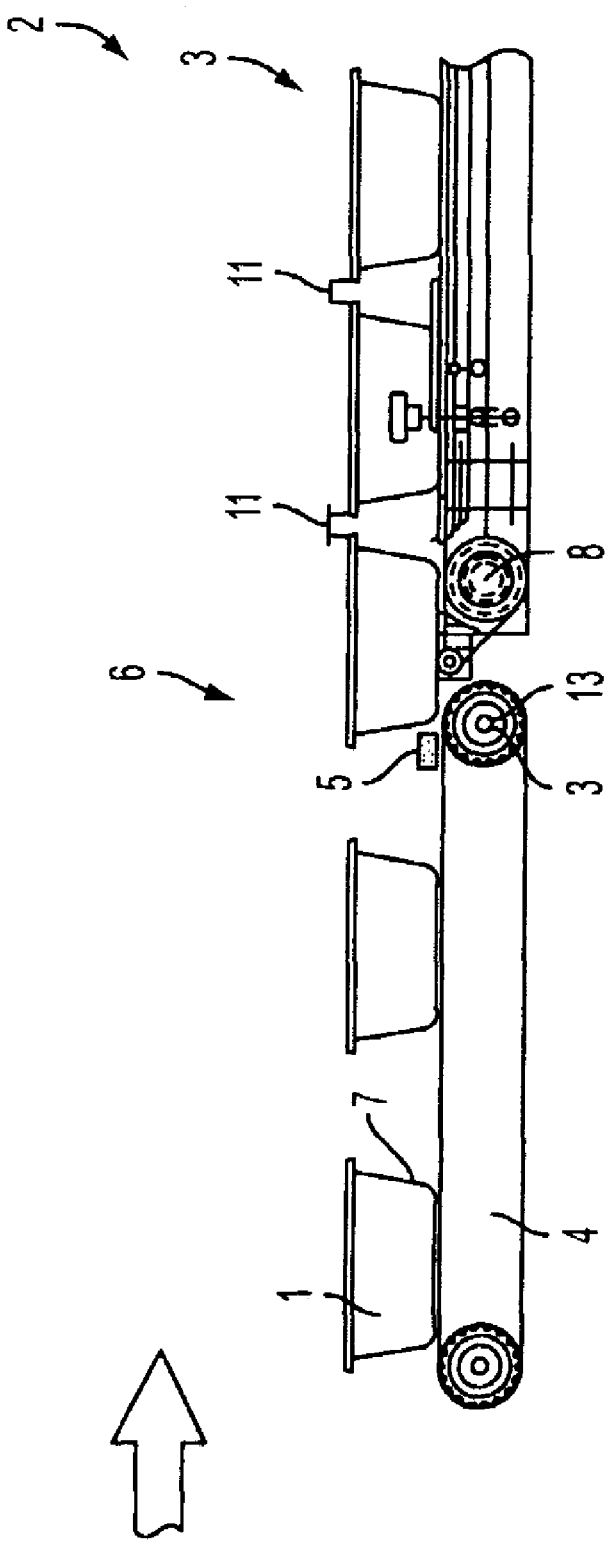
FIG. 1 shows one embodiment of the infeed system of the inventive machine.

FIG. 1 shows the unit 2 for feeding containers to be sealed to the sealing unit (not shown). The unit 2 comprises an accumulation conveyor 3 and a feeder conveyor 4. The direction of motion of the containers is indicated by the arrow. In the present example, the feeder conveyor 4 is an endless belt. The feeder conveyor 4 comprises a sensor 5 which detects the front edge 7 of the containers 1. The feeder conveyor 4 is driven continuously by a motor 13. Additionally, the feeder conveyor comprises detection means 9 to detection the speed of motion of the feeder conveyor 4. Alternatively, it is possible to operate the feeder conveyor 4 at a constant speed. Then the detection, means 9 are not needed. The signal of the sensor 5 and the signal of the detection means 9 or the desired constant speed are transferred to a control unit that controls motor means 8, which drives the accumulation belt. Based on these signal of the sensor 5 and the information about the speed of the feeder conveyor 4, the control unit controls the motor 8 such that the correct gap between two adjacent containers is created on the accumulation conveyor and that the speed of the accumulation conveyor and the feeder conveyor are synchronised during the handing over of the containers 1 from the feeder conveyor 4 to the accumulation conveyor 3. This is done as follows:

The accumulation conveyor stands still until sensor 5 detects a new tray. Based on the desired gap 11, motor means 8 accelerate the accumulation conveyor 3 faster of slower until the accumulation conveyor 3 has reached a velocity related to the feeder conveyor 4, preferably equal to the speed of the feeder conveyor. This process is controlled by a control unit (not shown). This velocity of the accumulation conveyor 3 is then preferably maintained until the container has at least partially been handed over from the feeder conveyor 4 to the accumulation conveyor 3. After this handing over, the accumulation belt 2 is decelerated again until it comes to a stop. The rate of deceleration is also based on the size of the desired gap 11. The person skilled in the art understands that the accumulation belt needs not come to complete stop after each positioning of a container. Only if one set of containers 1 on the accumulation conveyor 3 is completed, the accumulation conveyor 3 comes to a complete stop and two pusher arms 16 grab the containers and feed them to the sealing unit (not depicted).

Figure 2:
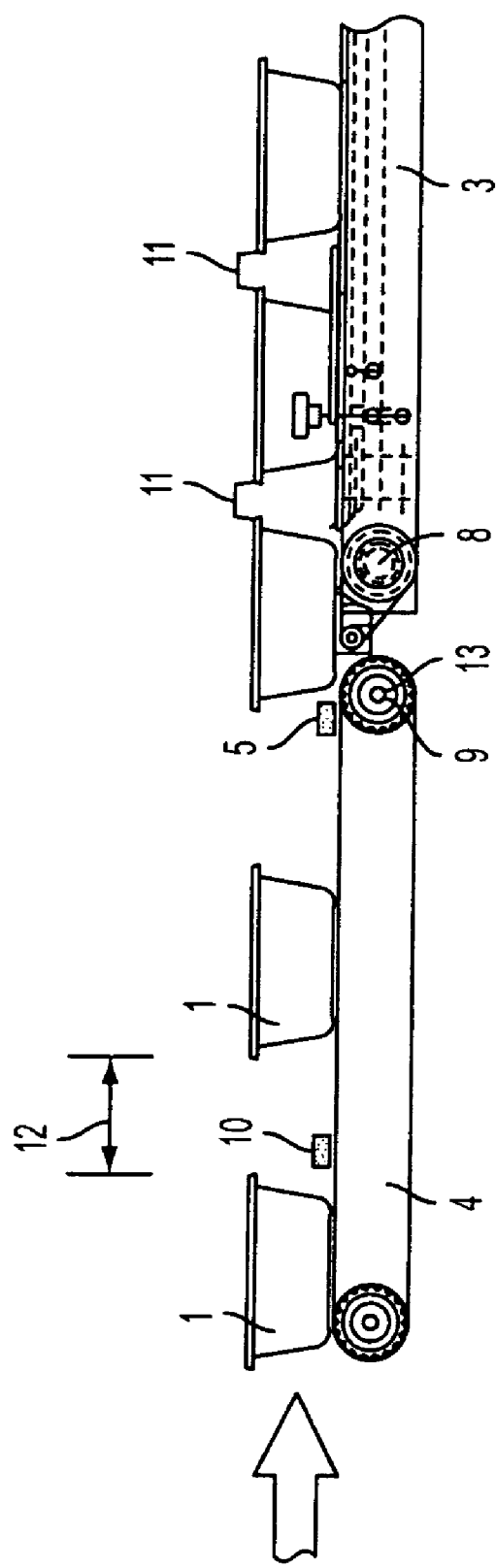
FIG. 2 shows a machine with two sensors.

FIG. 2 shows the unit 2 for feeding containers to be sealed according to FIG. 1 but with an additional sensor 10 which is located upstream of sensor 5. This sensor 10 measures the distance 12 between two containers 1 and 1' on the feeder conveyer 4. If this distance 12 is smaller than the minimum gap needed for the handover of tray 1 before tray 1' is coming to the handover position as well, the control unit slows down motor 13 of the feeder conveyor 4 to give the accumulation conveyor 3 enough time to increase the distance between tray 1 and 1', before tray 1' is in the handover position to the accumulation conveyor. This increases the distance between containers 1 and 1', so that the control unit is able to maintain the desired gaps 11. Alternatively or in combination with the above mentioned control scheme a mechanical mean can temporarily slow down the tray 1' in order to increase the gap between 1 and 1'.

Figure 3:
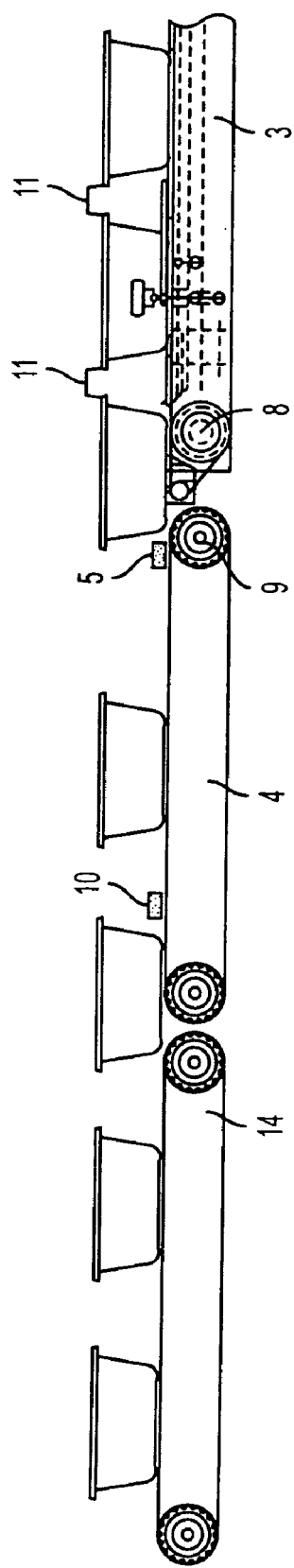
FIG. 3 shows an infeed system with an external feeder conveyor.

FIG. 3 shows the system according FIG. 2 which additionally comprises an external feeder conveyor 14 which operates at continuous or random speed. This conveyor is not necessarily controlled by the control unit.

Figure 4:
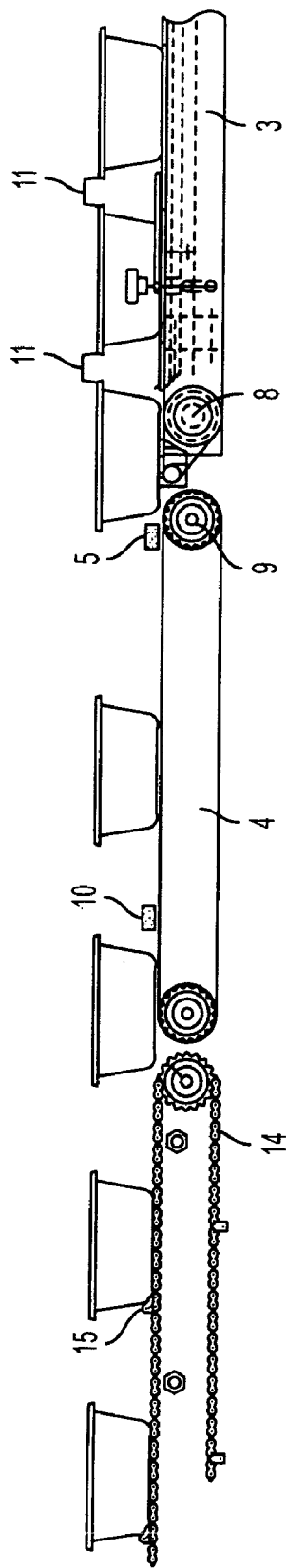
FIG. 4 shows another infeed system with an external feeder conveyor.

FIG. 4 shows a system according to FIG. 3, whereas the external feeder conveyor 14 is in the present example a chain with pushers 15.

LIST OF REFERENCE NUMBERS 1, 1' containers
2 unit for feeding containers
3 accumulation conveyor
4 feeder conveyor
5 first sensor
6 end-zone of the feeder conveyor
7 front edge of the container
8 motor means
9 detection means
10 second sensor
11 desired-gap
12 random distance between two trays
13 motor means
14 external feeder conveyor
15 pusher

What is claimed is:

1. Machine for feeding containers to be processed by a processing unit, which comprises an accumulation conveyor (3), located upstream of the processing unit and driven by a first motor means (8), and a feeder conveyor (4), which feeds containers to the accumulation conveyor (3) and is driven by a second motor means (13), wherein the machine further comprises: a first sensor (5) adjacent the feeder conveyor (4), for detecting, a container (1); and a control unit, which controls the first motor means (8) such that a desired gap (11) is created between two adjacent containers (1) on the accumulation conveyor (3), and that the speed of the accumulation conveyor (3) and of the feeder conveyor (4) are equal during at least a partial handing over of the container (1) from the feeder conveyor (4) to the accumulation conveyor (3).

2. Machine according to claim 1, wherein the machine further comprises a second sensor (10), upstream of the first sensor, which detects the distance (12) between two containers on the feeder conveyor (4).

3. Machine according to claim 2, wherein the second sensor (10) is connected to the control unit, which reduces the speed of the feeder conveyor (4), if the distance (12) between two containers on the feeder conveyor (4) is significantly smaller than a minimum gap needed for the handover of a container as the container approaches the accumulation conveyor.

4. Machine according to claim 1, wherein the motor means (8, 13) are servo motors.

5. Machine according to claim 1, wherein the feeder conveyor (4) operates at continuous or random speed.

6. A machine according to claim 1, wherein the first sensor (5) is in an end-zone (6) of the feeder conveyor (4), to detect a front edge (7), of the container (1).

7. A machine according to claim 6, further comprising a detection means (9) to detect the speed of the feeder conveyor (4), wherein the first sensor (5) and the detection means (9) are connected to the control unit, which controls the first motor means (8).

* * * * *